United States Patent

Le Gall

[15] 3,638,707
[45] Feb. 1, 1972

[54] LOCALLY STRENGTHENED TIRE FLAPS

[72] Inventor: Jacques Le Gall, Compiegne, France

[73] Assignee: Uniroyal Englebert France S.A., Paris, France

[22] Filed: Jan. 10, 1969

[21] Appl. No.: 790,499

[30] Foreign Application Priority Data

Feb. 16, 1968 France .................................... 140249

[52] U.S. Cl. .......................................................... 152/365
[51] Int. Cl. ......................................................... B60c 21/04
[58] Field of Search ................... 152/365, 366, 349, 330, 350

[56] References Cited

UNITED STATES PATENTS

| | | | |
|---|---|---|---|
| 2,773,535 | 12/1956 | Tolonen | 152/365 |
| 3,315,722 | 4/1967 | Marzocchi et al. | 152/359 |
| 2,056,012 | 9/1936 | Madge et al. | 152/355 |
| 2,902,072 | 9/1959 | Reuter | 152/330 |

FOREIGN PATENTS OR APPLICATIONS

| | | | |
|---|---|---|---|
| 18,544 | 1914 | Great Britain | 152/365 |

Primary Examiner—Arthur L. La Point
Assistant Examiner—Robert Saifer
Attorney—Norbert P. Holler

[57] ABSTRACT

A novel construction for locally strengthened tire flaps made of rubber and having circumferentially uniform cross-sectional characteristics is disclosed, together with a method of producing such flaps. In the preferred form of the invention, the major portion of the flap is made of a standard soft rubber stock, while the remaining minor portion of the flap, in which the valve-stem-accommodating hole is provided, is made of a different rubber stock having, when cured, a greater hardness and resistance to distortion or tearing stresses than the standard rubber stock. The flap is produced by splicing the two ends of an appropriately short length of the raw hard rubber stock to the respective ends of an appropriately longer strip of the raw soft rubber stock, thereby forming a ring, and then introducing the ring into any suitable annular mold, e.g. a compression mold, for final shaping and curing by which the two rubber sections are vulcanized into an integral continuous structure.

9 Claims, 6 Drawing Figures

PATENTED FEB 1 1972 3,638,707
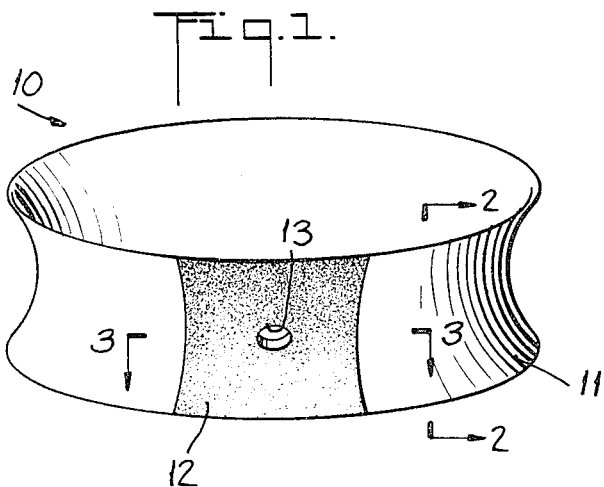
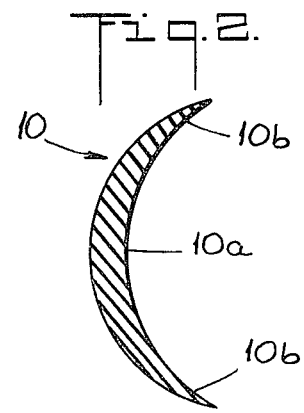
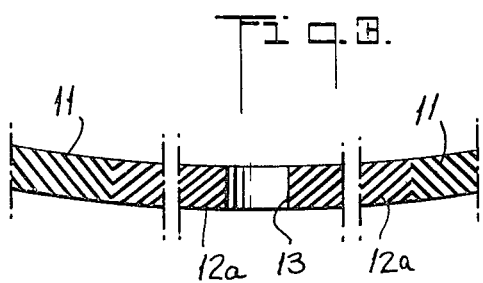
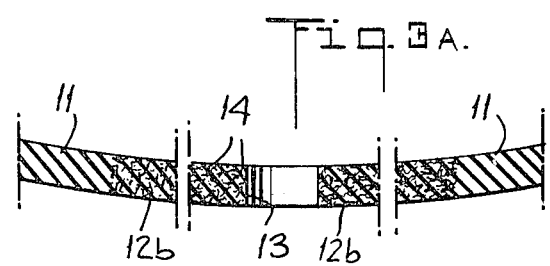
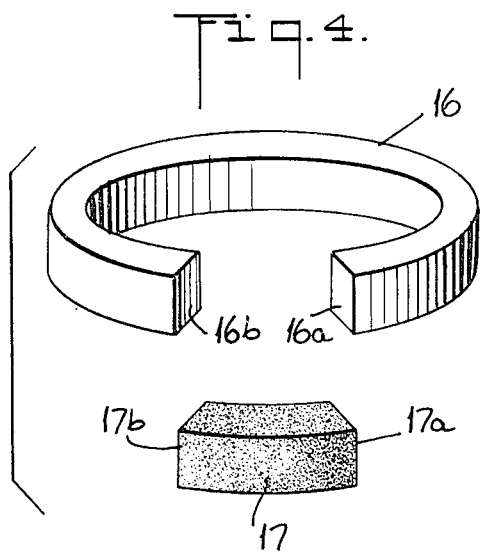
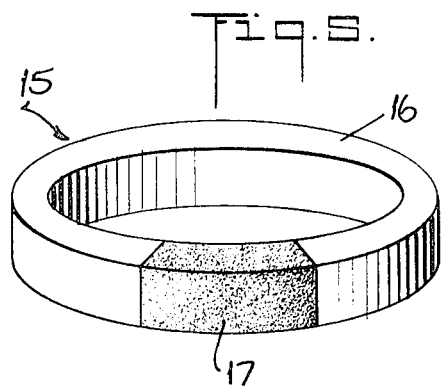
INVENTOR.
JACQUES LE GALL
BY Norbert P. Holler
ATTORNEY

LOCALLY STRENGTHENED TIRE FLAPS

The foregoing abstract is not to be taken either as a complete exposition or as a limitation of the present invention, and in order to understand the full nature and extent of the technical disclosure of this application, reference must be had to the following detailed description and the accompanying drawing as well as to the claims.

This invention relates to locally strengthened tire flaps and to a process for the manufacture of such flaps.

A tire flap is comparatively thick, continuous band, heretofore generally made either of rubber or of fabric or of a combination thereof, which is placed between the inner tube of a pneumatic tire and the wheel rim therefor to protect the tube from damage which might otherwise be caused by rocking movement of the beads of the tire and by abrasion by the rim, and to prevent entry of foreign material into the interior of the tire casing. In any flap of the known types, soft rubber is invariably used, and the hardness and stretch properties of the rubber are always uniform along the entire circumference of the flap.

Inasmuch as the inner tube is provided with a valve stem which must extend through an opening in the wheel rim to permit inflation and deflation of the tube, the tire flap also has an opening or hole therein to allow the valve stem to extend therethrough. In the region of the valve stem hole, the flap, as a result of the pressure exerted by the inner tube and the deformations which the latter undergoes in service, is subjected to frequently considerable distortions and tearing stresses of such a nature as to cause relatively rapid deterioration and destruction of the said region of the flap. Heretofore it has been conventional, therefore, in order to prevent possible deterioration of the flap, to reinforce the same in the valve hole region either by increasing its thickness, or by incorporating a plate of metal or a strip of rubber-coated fabric in the preshaped raw flap. This expedient, of course, leads to certain inconveniences and complications in the building, shaping, molding and curing of the flap, and in practice generally also cannot be carried out without making the valve stem hole region of the flap circumferentially somewhat thicker in cross section than the remainder of the flap.

It is an object of the present invention, therefore, to provide a novel tire flap construction and method of producing the same whereby the aforesaid disadvantages and drawbacks attending the known constructions of this type and their methods of manufacture may be efficaciously avoided.

It is another object of the present invention to provide a tire flap construction characterized by a novel means of locally strengthening the valve stem hole region of the flap in such a manner as not to require the provision of any local extra thickness or added sheet material reinforcing member.

It is also an object of the present invention to provide such a tire flap which is characterized by circumferentially uniform cross-sectional shape and dimensions and the production of which is both simple and economical.

Generally speaking, the objectives of the present invention are attained by virtue of the fact that the entire flap is made of rubber, the major portion of the flap being made of a standard "soft" rubber stock compounded to have, when cured, a normal modulus of elasticity and hardness, and the minor portion of the flap incorporating the valve stem hole being made of a "hard" rubber stock prepared to have, when cured, a higher modulus and greater hardness, and thus a higher resistance to distortion and tearing stresses, than the aforesaid standard rubber of which the major portion of the flap is made. The flap thus is provided with a region of greater strength without any increase in thickness. The desired extra hardness of the second rubber stock may be achieved either by an appropriate compounding thereof in ways of which are well known to those skilled in the rubber processing art in general, or, in accordance with a modified aspect of the present invention, by incorporating in the second rubber stock fibers of glass or natural or synthetic textile materials.

For the manufacture of a tire flap as defined herein, the process according to the present invention is essentially characterized by the fact that a ring of raw rubber is initially formed in which a given volume of the raw material is constitutively nonhomogeneous with the remaining volume of the raw part, the composite thus obtained then being subjected to a single molding and curing operating under the same pressure and temperature conditions.

The foregoing and other objects, characteristics and advantages of the present invention will be more clearly understood from the following detailed description thereof when read in conjunction with the accompanying drawing, in which:

FIG. 1 is a perspective view of a locally strengthened tire flap constructed according to the present invention;

FIG. 2 is a sectional view, on an enlarged scale, taken along the line 2—2 in FIG. 1;

FIGS. 3 and 3A are fragmentary sectional views, on an enlarged scale, taken, respectively, along the line 3—3 in FIG. 1 and illustrating two embodiments of the present invention;

FIG. 4 is an exploded perspective view of raw rubber parts adapted to form a ring to be used in making a tire flap of the present invention; and FIG. 5 is a perspective view of such a ring in assembled precure condition.

Referring now to the drawing in greater detail, the tire flap 10 according to the present invention (the illustration, merely by way of example, is of a flap suited for use with large-size tire casings such as are normally found on so-called "heavy service" vehicles) comprises a major circumferential portion 11 and a minor circumferential portion 12 (FIG. 1) integrally united therewith by molding. A hole or opening 13 designed to accommodate the valve stem of an inner tube (not shown) is provided in the portion 12. The cross-sectional shape of the flap is generally crescentlike (FIG. 2) with a relatively thick middle region 10a merging gradually into a pair of relatively thinner marginal regions 10b, but other cross-sectional shapes could be used as well.

It is, of course, essential that a tire flap be strengthened or reinforced in the region of the valve stem hole so as to be able to withstand the stresses and distortions to which it is subjected to use. As previously indicated, in the known types of flaps this local reinforcement has invariably been effected either by the provision of an increased thickness of the flap at that region, or by the incorporation of an extrinsic reinforcing structure such as a sheet of metal or fabric in the flap at that region, neither of which expedients is without disadvantages and both of which tend to complicate the building, shaping, molding and curing of the flap.

In accordance with the principles of the present invention, however, these disadvantages and complications are effectively avoided, and the local strengthening of the flap is achieved without recourse to either of these expedients. Thus, both the cross-sectional shape and the thickness characteristics of the flap are uniform along its entire circumference, being the same as shown in FIG. 2 in both the portions 11 and 12 of the flap, which greatly simplifies the building as well as the molding of the flap.

More specifically, the tire flap 10 according to the present invention is characterized by the fact that the value hole portion 12 thereof is made constitutively different with respect to the major portion 11. To this end, the latter portion of the flap is made of a standard rubber stock, e.g., natural or synthetic rubber or blends thereof, compounded with conventional ingredients to have, when cured, a normal hardness and modulus of elasticity, while the portion 12 accommodating the valve stem hole 13 is made of rubber stock treated to have, when cured, a greater hardness and higher modulus than the rubber of which the portion 11 is made. Advantageously, the major portion 11 of the flap is made of what may be termed "soft" rubber, i.e., rubber having a "Shore A" hardness of less than about 65–70 and preferably in the range of about 55–60, while the minor portion 12 is made of what may be termed "hard" rubber, i.e., rubber having a "Shore A" hardness in excess of about 70 and preferably in the range of about 80–85.

The desired enhanced hardness of the valve hole portion of the flap may, however, be attained in different ways. This, in accordance with one aspect of the present invention, as illustrated in FIG. 3, the valve hole portion 12a of the flap is made in its entirety of rubber, the increased hardness being the result of an appropriate compounding of the starting raw rubber stock in accordance with generally conventional practice and well-known rubber-processing principles. In accordance with another aspect of the present invention, as illustrated in FIG. 3A, the valve hole portion 12b is made of rubber having incorporated therein (through an initial admixture with the raw rubber stock) a mass of randomly oriented fibers 14 of glass or any suitable natural or synthetic textile material such as cotton, nylon, rayon, polyester, and the like, the percentage ratio of the rubber to fiber content being about 88 to 12. In this latter case, of course, it will be apparent that the raw rubber stock per se may be compounded so that, if there were no fiber component, its hardness upon curing would be less than that prescribed for the hard rubber herein, since the incorporation of the fibers will suffice to bring the hardness of the composite up to the required level.

By virtue of its greater hardness, the valve hole portion (12a or 12b) of the flap has a substantially enhanced resistance to distortion and tearing stresses with respect to the standard rubber remainder 11 of the flap. In accordance with the present invention, therefore, it is feasible to design the flap for an optimum hardness relationship between the portions 11 and 12 so as to assure that the tearing and deforming action to which the valve hole portion 12 is subjected in service as a result of the pressure exerted by the inner tube and the movements of the valve stem thereof do not cause greater wear or deformations in the portion 12 than those undergone by the portion 11, and especially no tears in service.

Referring now to FIGS. 4 and 5, for the purpose of making a flap according to the present invention, a ring 15 (FIG. 5) of generally square or rectangular cross section is formed of two elements of raw rubber stock (FIG. 4), one a relatively long strip 16 of natural or synthetic standard "soft" rubber stock, and the other a relatively short strip 17 of the same cross section and made of a "hard" natural or synthetic rubber stock, i.e., one which has been treated by compounding or the incorporation of fibers, to have, when cured at the same temperature as the rubber constituting the strip 16, a greater hardness than the latter. Preferably, the strips 16 and 17 are spliced and adhered to one another in the uncured state by simply applying the respective ends 17a and 17b of the latter against the corresponding ends 16a and 16b of the former in such a way as to constitute the continuous ring 15. This ring, visibly devoid of extra thickness and having no sheet-reinforcing members incorporated in the valve hole portion 17, thus constitutes the raw part or blank for the flap. The blank is then placed into a suitable mold or press (not shown), the "hard" rubber part 17 being disposed in the valve hole zone reserved for this purpose in the mold itself. When the mold is closed, the rubber is put under pressure and flows until it fills up the entire mold cavity, the curing then being effected by bringing the temperature of the mold to the common curing temperature of the two rubber stocks. Under these conditions, the "hard" rubber stock remains confined in the valve hole zone and fuses with the adjoining "soft" rubber stock to yield a flap, such as shown at 10 in FIGS. 1 and 2, having a circumferentially uniform cross-sectional shape without any extra thickness in the valve hole region, and having a strength in this region which is adapted to the strains that it undergoes in service.

The local strengthening of the flap thus is obtained solely by means of the rubber being adapted by its mechanical characteristics to the strains occurring in the region involved and without its being necessary to reinforce the said region by an increase in the thickness of the flap or by the addition of extra sheet material. The flap according to the present invention is easier to build, has the regular appearance of a compression-molded object, and has the quality of products built with a number of stocks before curing.

It will be understood that the foregoing description of preferred embodiments of the present invention is for purposes of illustration only, and that the various features of the structures and methods herein disclosed are susceptible to a number of modifications and changes none of which entails any departure from the spirit and scope of the present invention as defined in the hereto appended claims. Merely by way of example, the principles of the present invention may be applied to the manufacture of other objects of natural or synthetic rubber having several portions which in service are subjected to special strains or actions that require one portion to have a higher hardness or resistance to stresses than another portion.

Having thus described my invention, what I claim and desire to protect by Letters Patent is:

1. A tire flap, comprising a continuous, annular structure integrally molded of rubber and having a circumferentially uniform cross-sectional shape and thickness profile, said structure having an inner tube valve stem-accommodating hole therein and being composed of a major circumferential portion of rubber having a hardness of below 70 and down to about 55 on the "Shore A" scale and a minor circumferential portion of rubber having a hardness of about 70 and up to about 85 on the "Shore A" scale, in the latter of which portions said valve stem-accommodating hole is located, the composition of said minor portion of said structure being substantially constant throughout its entirety, with neither any local thickening nor any sheet material reinforcement being present in the region of said valve stem-accommodating hole, and said minor portion of said structure solely by virtue of its higher hardness affording the required high resistance to distortion and tearing stresses to which said region of said structure is normally subjected when the flap is in service.

2. A tire flap according to claim 1, wherein the hardness of said minor portion of said structure is in the range of about 80-85 on the "Shore A" scale.

3. A tire flap according to claim 1, wherein the hardness of said major portion of said structure is in the range of about 55-60 on the "Shore A" scale.

4. A tire flap according to claim 3, wherein the hardness of said minor portion of said structure is in the range of about 80-85 on the "Shore A" scale.

5. A tire flap according to claim 1, wherein the desired higher hardness of said minor portion of said structure is provided by an appropriate compounding of the starting raw rubber stock.

6. A tire flap according to claim 1, wherein the desired higher hardness of said minor portion of said structure is provided by a mass of randomly oriented fibers of filamentary material incorporated in the rubber.

7. A tire flap according to claim 6, wherein said filamentary material is glass fiber.

8. A tire flap according to claim 6, wherein said filamentary material is selected form the group consisting of natural and synthetic textile fibers.

9. A tire flap according to claim 6, wherein the fiber content of the rubber of which said minor portion of said structure is made is about 12 percent.

* * * * *